(12) United States Patent
Kim et al.

(10) Patent No.: US 7,936,765 B2
(45) Date of Patent: May 3, 2011

(54) METHOD AND APPARATUS FOR DYNAMICALLY ALLOCATING BANDWIDTH BY HIERARCHICAL WEIGHT ROUND ROBIN

(75) Inventors: Chan Kim, Daejeon (KR); Tae Whan Yoo, Daejeon (KR); Bong Tae Kim, Daejeon (KR)

(73) Assignee: Eletronics and Telecommunications Research Institute, Daejeon (KR)

( * ) Notice: Subject to any disclaimer, the term of this patent is extended or adjusted under 35 U.S.C. 154(b) by 761 days.

(21) Appl. No.: 11/948,950

(22) Filed: Nov. 30, 2007

(65) Prior Publication Data

US 2008/0130657 A1    Jun. 5, 2008

(30) Foreign Application Priority Data

Dec. 1, 2006   (KR) .................. 10-2006-0120329
Jul. 16, 2007  (KR) .................. 10-2007-0071022

(51) Int. Cl.
   *H04L 12/28*   (2006.01)
   *H04L 12/56*   (2006.01)
   *H04J 3/16*    (2006.01)

(52) U.S. Cl. ......................... 370/395.41; 370/468

(58) Field of Classification Search .................. None
   See application file for complete search history.

(56) References Cited

U.S. PATENT DOCUMENTS

| 6,546,014 | B1 | 4/2003 | Kramer et al. |
| 7,639,694 | B2 * | 12/2009 | DeCarolis et al. ......... 370/395.4 |
| 2002/0027682 | A1 | 3/2002 | Iwasaki et al. |
| 2004/0109688 | A1 * | 6/2004 | Kim et al. ...................... 398/68 |
| 2004/0252714 | A1 | 12/2004 | Oh et al. |
| 2005/0058135 | A1 * | 3/2005 | Sisto et al. ................ 370/395.2 |
| 2005/0249497 | A1 | 11/2005 | Haran et al. |

FOREIGN PATENT DOCUMENTS

| JP | 2002-101132 | 4/2002 |
| KR | 2004-0039781 | 5/2004 |
| KR | 2004-0048102 | 6/2004 |
| KR | 2004-0050337 | 6/2004 |
| KR | 20040108135 | 12/2004 |
| KR | 20050061996 | 6/2005 |

\* cited by examiner

*Primary Examiner* — Chirag G Shah
*Assistant Examiner* — Srinivasa R Reddivalam
(74) *Attorney, Agent, or Firm* — Rabin & Berdo, PC

(57) ABSTRACT

Provided are method and apparatus for dynamically allocating unlink bandwidth in Ethernet PON. In the method and apparatus, report value, which are received for each logical link identifications (LLID), is controlled to be less than a maximum gate value set for each LLID in sequence for all of LLIDs without a predetermined interval. A gate having a length corresponding to the restricted report value is generated. LLIDs are grouped into classes and processing is done class by class. For each class processing, if maximum processing time is reached or maximum total allocation is reached, the processing is switched to a lower class. Also each class processing, if any higher class has its maximum yield processing time or maximum yield allocated gate reached, the processing is switched to that higher class.

18 Claims, 7 Drawing Sheets

METHOD AND APPARATUS FOR DYNAMICALLY ALLOCATING BANDWIDTH BY HIERARCHICAL WEIGHT ROUND ROBIN

CROSS-REFERENCE TO RELATED APPLICATIONS

This application claims the priority of Korean Patent Application No. 10-2006-120329, filed on Dec. 1, 2006, and the priority of Korean Patent Application No. 10-2007-71022, Jul. 16, 2007, in the Korean Intellectual Property Office, the disclosure of which is incorporated herein by reference.

BACKGROUND OF THE INVENTION

1. Field of the Invention

The present invention relates to a method and apparatus for dynamically allocating uplink bandwidth for transmitting frames from an optical network unit (ONU) to an OLT in an Ethernet passive optical network (EPON).

The present invention was supported by the IT R&D program of MIC/IITA. [2005-S-401-02, Project title: High Speed Optical Network Technology].

2. Description of the Related Art

In an EPON, one of optical network technologies, an OLT located at a network side is connected to a plurality of optical network units (ONUs) or optical network terminals (ONTs) located at a subscriber side through optical fibers and splitters, thereby forming a point to multipoint optical network.

FIG. 1 is a diagram illustrating an EPON. In the EPON, an OLT 11 transmits downlink frames to all of ONUs 12 to 14 connected to the OLT 11 in a broadcasting scheme. Herein, the downlink frame is a frame transmitted through a downlink from the OLT 11 to the ONUs 12 to 14. OLT 11 marks the frames with the destination of corresponding frames by inserting a logical link identification (LLID) in a preamble section in the front of the received frame. That is, an ONU having the corresponding LLID is only allowed to receive the downlink frames. Similarly, an uplink frame, which is transmitted from the ONUs to the OLT, also has an LLID in the preamble section thereof in order to inform which ONU transmits the uplink frame.

ONUs 12 to 14 transmit uplink frames to the OLT through the same uplink channel. If more than two ONUs transmit uplink frames at the same time, the OLT 11 cannot normally receive each of the uplink frames because the signals may overlap. Accordingly, the OLT 11 controls the uplink transmission times of the ONUs 12 to 14 and allocates a bandwidth to the ONUs 12 to 14 for transmitting uplink frames. In the EPON, a gate denotes a transmission time allocated to each of ONU. In order to allocate a transmission time to each of the ONU, the OLT 11 transmits a gate frame to the ONU 12. The gate frame includes a grant value that indicates a transmission start time and duration. Hereinafter, terms 'gate' and 'grant' are used without distinction for convenience.

The ONUs 12 to 14 transmits a request of transmitting uplink frames to the OLT 11 by informing the OLT 11 of the amount of data stored in uplink queues. The request of transmitting uplink frame is referred as a report frame. The ONUs can transmit the report frame in an allocated transmission time. The OLT 11 can dynamically allocate a bandwidth according to the data amount of each ONU, which is transmitted through the report frame.

In the EPON, a multi-point control protocol (MPCP) is used to process auto-registration, reports, and grants. The MPCP may be considered as the extension of a conventional MAC protocol that uses a basic pause.

An OLT transmits all MPCP frames to ONUs with a timer value of the OLT. The ONUs update own timers with the received timer value of the OLT whenever the ONUs receive the timer value of the OLT. The timer of the ONU increases with the same clock of the OLT timer at every moment.

The ONU also transmits the MPCP frame to the OLT with the timer value of the ONU. The OLT calculates a round trip time (RTT) of each ONU by subtracting the received timer value from the own timer whenever the OLT receives the MPCP frame with the ONU's timer value. The OLT uses the calculated RTT of each ONU to transmit the grant frame. In more detail, the OLT decides the start times of grants to ONUs such that gates are not overlapped. When the OLT transmits the gates, the OLT subtracts the RTT value of each ONU from the start time of the grant in order to compensate the transmission delay caused by a distance. According to the compensated start time of the grant, an ONU far away from the OLT transmits an uplink frame early as much as the RTT. Therefore, the uplink frames arrive at the OLT without overlapped regardless of the RTT.

In the EPON system, the duration of the grant is decided at first and the start time of the grant is decided when the gate is decided. In order to effectively communicate, the duration of the grant must be properly allocated to each of the ONUs. The operation of allocation the duration of the grant is the bandwidth allocation operation.

In general, an OLT allocates the bandwidth by regularly collecting reports from ONUs and deciding a gate value of each ONU according to the uplink data amount thereof. Since the OLT does not transmit gate to the ONUs until the OLT receives all of the ONUs' reports, the gate is delayed as much as a dynamic bandwidth allocation cycle in average. Due to the delay of the gate, the transmission delay essentially occurs.

In case of regularly performing a bandwidth allocation operation, overhead increases because additional gate is used for collecting the reports. Therefore, the overall throughput decreases.

SUMMARY OF THE INVENTION

According to an aspect of the present invention, there is provided a method for dynamically allocating a bandwidth based on a hierarchical weight round robin scheme. In the method, reports, which are received by LLID that are allocated to ONUs, are read. Then, the read report value is controlled to be less than a maximum gate value set for a corresponding LLID. A gate having a length corresponding to the restricted report value is generated. Then, a report used for generating a gate is deleted. The operations of reading the reports, restricting the read report value, generating the gate, and deleting of the report are repeatedly performed in sequence for all of LLIDs without a predetermined interval.

In the method, before the generating of the gate having a length corresponding to the restricted report value, it is confirmed whether a rate restricting function for a corresponding LLID is activated or not. Then, it is determined whether a transmission token value that is set to restrict the generate gate amount for a corresponding LLID is enough or not if the rate restricting function is activated. It is confirmed whether a transmission token value is sufficient or not by comparing a transmission token value of a corresponding LLID and the gate length to generate if the transmission toke value is not 0. Then, a gate having a length corresponding to the read report is not generated and a report for a next LLID is read if the transmission token value is 0 or if the transmission token value is insufficient. The gate is generated if the rate restricting function is inactivated or if the transmission token value is sufficient.

In the method, the operation of reading the reports received according to the LLID and generating gates may include operations of setting a maximum processing time and a maximum allocation amount according to each LLID class, counting a processing time and an allocation amount, which are a gate time and a allocation amount continuously generated from a corresponding class according to each of LLID classes, and changing a processing class to a next class if the counted processing time exceeds the maximum processing time or if the allocation amount exceeds the maximum allocation amount, each LLID belonging to a single class. Also, the operation of reading reports received according to the LLIDs and generating gates may include operations of setting a maximum yield processing time and a maximum yield allocation amount according to each of LLID classes, counting a yield time and a yield allocation amount, which are a gate processing time and a gate allocation amount of a lower class according to each of LLID classes, and changing a processing class to a class that exceeds the maximum yield processing time or the maximum yield allocation amount if the counted yield time exceeds the maximum yield processing time or if the counted yield allocation amount exceeds the maximum yield allocation amount, each LLID belonging to a single class.

According to another aspect of the present invention, there is provided an apparatus for dynamically allocating a bandwidth including a first table, a report writer, and a dynamic gate generator. The first table stores information for dynamically allocating a bandwidth, which includes report values according to LLID. The report writer records a report value of the received message at the first table if a report message is received from an ONUs. The dynamic gate generator repeatedly performs operations of sequentially reading report values of each LLID without a predetermined cycle, generating a gate having a length corresponding to the report value, and deleting the report value with a gate generated from the first table.

The apparatus may further include a third table for storing transmission token values for controlling a gate generating rate for each LLIDs, wherein the dynamic gate generator checks a transmission token value for a corresponding LLID before a gate is generated, and generates a gate only if the third table includes a transmission token value sufficient to the generated gate length.

The apparatus may further include a transmission token writer for increasing transmission token values of all LLIDs in the third table by a predetermined unit at a predetermined interval.

The dynamic bandwidth allocating method and apparatus according to an embodiment of the present invention sequentially read report values according to LLIDs without a predetermined period, restrict the report values with the maximum gate value set according to a corresponding LLID, and generate the corresponding length of a gate. Therefore, a problem of transmission delay, which is caused by a bandwidth allocating cycle, can be eliminated.

In the dynamic bandwidth allocation method and apparatus, a report that have been used for generating a gate is removed, a new report is transmitted using the last part of a burst by a gate, a gate transmission is skipped if a report value is 0, generation of a gate is monitored for each LLID, and a gate with fixed length grant is transmitted if a gate has not been generated for a predetermined time. Therefore, the overall throughput increases by minimizing uplink and downlink overhead.

In the dynamic bandwidth allocation apparatus and method according to present invention, LLIDs are classified into a plurality of classes, and the gate generation is processed by unit of class. The gate generation is controlled based on predetermined values according each class such as a maximum processing time, a maximum allocation amount, a maximum yield processing time, and a maximum yield allocation amount. Therefore, a bandwidth can be effectively allocated.

In the dynamic bandwidth allocation apparatus and method, a transmission token incases as much as a predetermined value at a regular interval for each LLID with a sufficiently short cycle. A gate is generated if only the transmission token is larger than or equal to the length of a gate to generate. After the gate is generated, the transmission token is reduced as much as the length of the gate. Therefore, a maximum gate generating rate can be controlled for each LLID.

BRIEF DESCRIPTION OF THE DRAWINGS

The above and other aspects, features and other advantages of the present invention will be more clearly understood from the following detailed description taken in conjunction with the accompanying drawings, in which:

FIG. 1 is a diagram illustrating an EPON system where the present invention is applied to;

DETAILED DESCRIPTION OF THE PREFERRED EMBODIMENT

Figure 1:
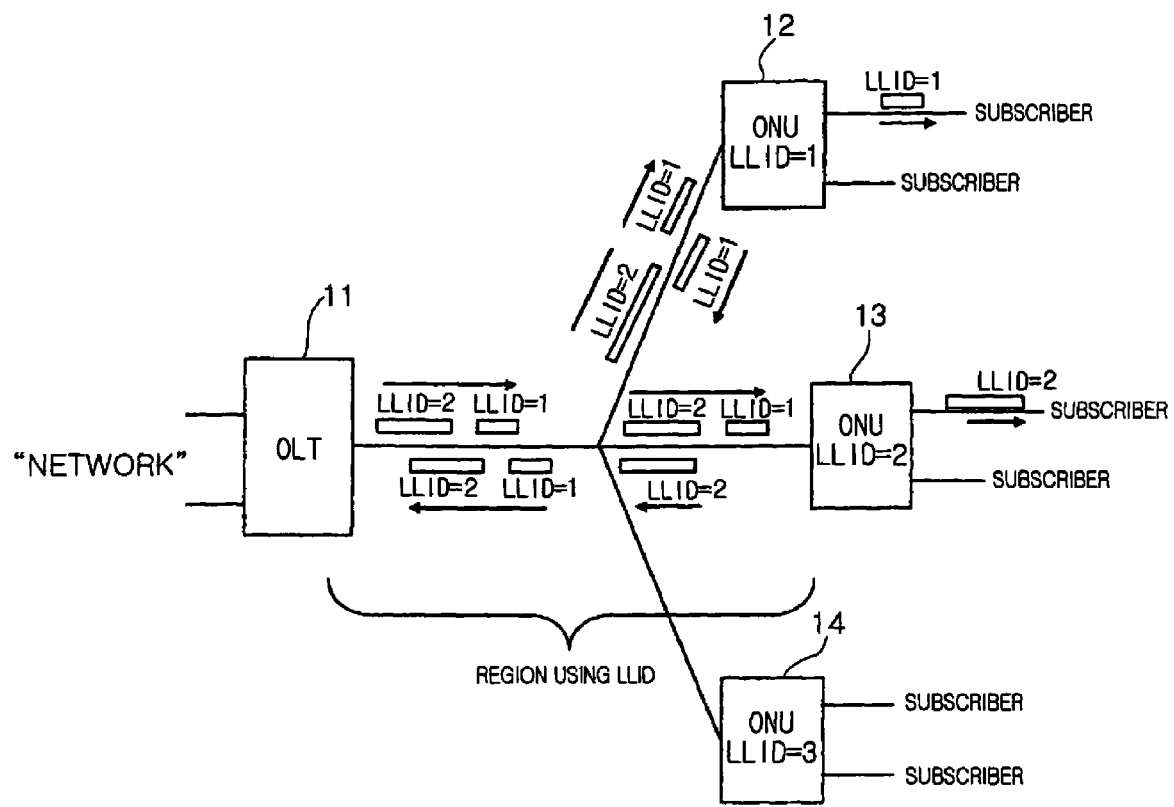

Exemplary embodiments of the present invention will now be described in detail with reference to the accompanying drawings. The detailed description of well-known functions and elements will be omitted.

Throughout the accompanying drawings, like reference numerals denote like elements.

Throughout the specification, if a part is described to be connected to the other part, it means not only that the part is directly connected to the other part but also the part is indirectly connected to the other part with another part interposed therebetween. Also, if a device is described to include a constituent element, it means that the device may further include the other constituent elements as well as the constituent element.

Each of constitute elements in the present invention is a unit for processing a predetermined function or operation. Each of the constitute elements can be embodied in software, hardware or the combination of software and hardware.

Figure 2:
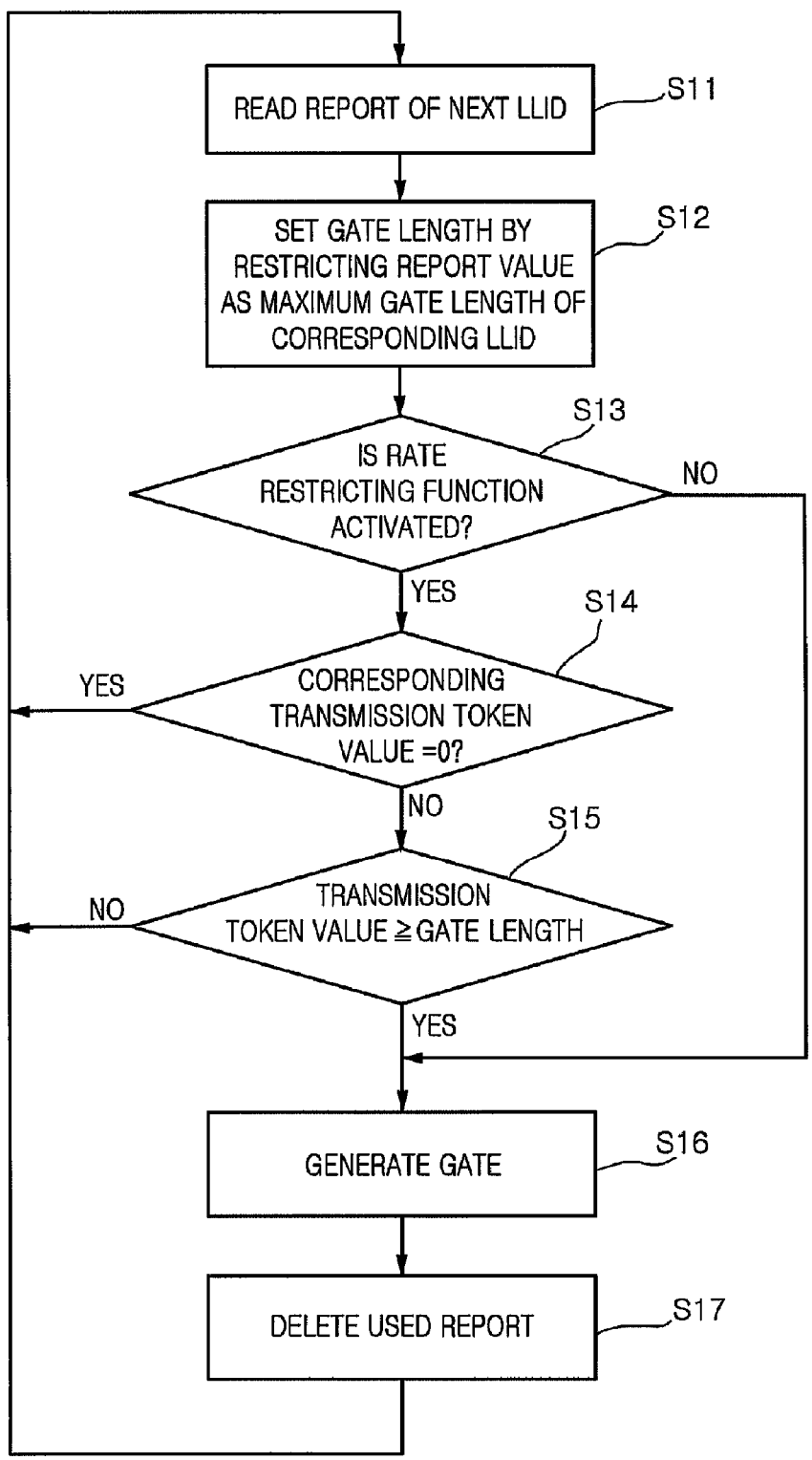
FIG. 2 is a flowchart illustrating a method for dynamically allocating a bandwidth according to an embodiment of the present invention.

FIG. 2 is a flowchart illustrating a method for dynamically allocating a bandwidth according to an embodiment of the present invention.

Referring to FIG. 2, in operation S11, report values, which are received according to LLIDs allocated to ONUs, are read.

In operation S12, the read report values are restricted to be less than the maximum gate values that are set for the corresponding LLIDs. The maximum gate values are previously set according to LLIDs.

In operation S16, a gate is generated with the predetermined length. In operation S17, the report of the LLID related to the generated gate is deleted.

In the present embodiment, the uplink data transmission delay of an ONU, which is caused by the bandwidth allocation delay, is reduced by repeatedly performing the operations S11, S12, S16, and S17 for all of LLIDs without any waiting for cycle start.

The report is transmitted from an ONU to an OLT during the last part of a burst that is transferred when the gate is transmitted. And, the stored report values of LLIDs are updated at the OLT based on the report received during the last part of the burst. Conventionally, the OLT uses additional gate to collect reports in case of regularly performing a bandwidth allocation operation. However, it is not necessary for the OLT to use additional gate for collecting the reports in the present embodiment because the report is transmitted through the last part of the burst. Therefore, the overall throughput can increase by reducing the overhead for collecting the report in the present embodiment.

It is preferred not to generate a gate if the read report value is 0 in the operation S11. As a result, unnecessary gate consumption can be prevented.

In the present embodiment, it is monitored whether a gate is transmitted or not to each of the LLIDs. If no gate has been transmitted for predetermined time for an LLID, the fixed length of a gate, which is set previously, is transmitted to the LLID regardless of a report value in the present embodiment. Therefore, the maximum polling interval can be controlled according to LLIDs in the present embodiment.

Furthermore, the generation of a gate can be controlled using a transmission token value that is set for each LLID in the present embodiment.

Referring to FIG. 2 again, in operation S13, it is determined whether a function of restricting bandwidth for a corresponding LLID is activated or not in order to restrict the bandwidth for each LLID before the operation S16.

If the function of restricting the bandwidth is activated in the operation S13, it is determined whether a transmission token value is 0 or not in operation S14. The transmission token value is a value set to restrict the bandwidth for a corresponding LLID.

If the transmission token value is not 0 in the operation S14, a transmission token value of a corresponding LLID is compared with the length of a gate to generate in operation S15, thereby confirming whether the transmission token value is sufficient or not. That is, it is determined whether the transmission token value is sufficient for the length of a gate to generate.

If the function of restricting the bandwidth is inactivated in the operation S13, or if it is determined that the transmission token value is sufficient in the operation S15, the decided length of a gate is generated in operation S16.

If the transmission token value is 0 in the operation S14, or if the transmission token value is insufficient in the operation S15, the operation S11 is performed again for the next LLID without the gate of a corresponding LLID generated.

As described above, the amount of generated gate is controlled by LLIDs in the present embodiment. Therefore, the bandwidth can be effectively allocated.

The transmission token values are managed for each LLID through an additional table. The transmission token value increases by a predetermined unit value within the maximum value at a regular interval.

Figure 3:
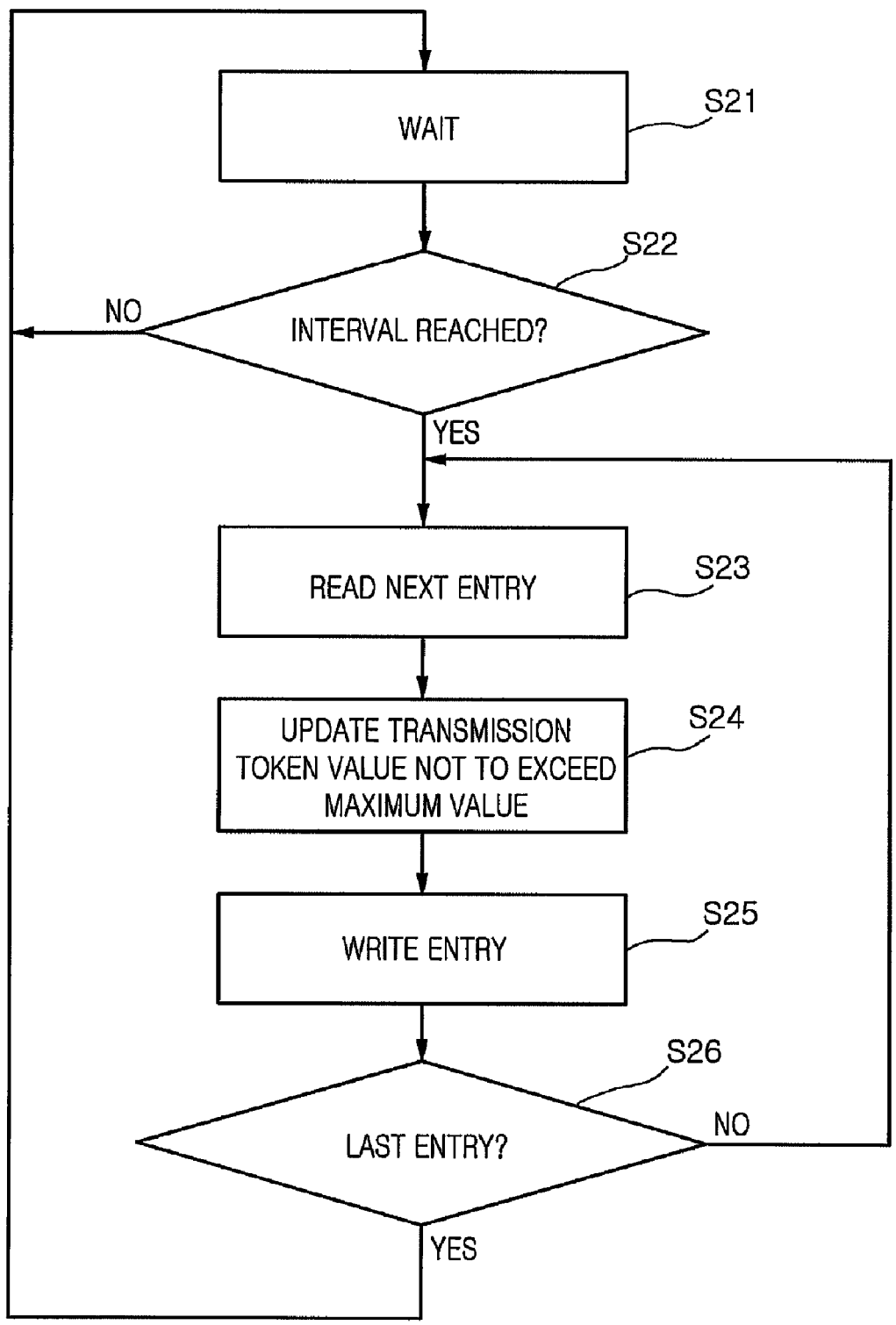
FIG. 3 is a flowchart illustrating a procedure of updating a transmission token value in a method for dynamically allocating a bandwidth according to an embodiment of the present invention.

FIG. 3 is a flowchart illustrating an operation for updating a transmission token value in a method for dynamically allocating a bandwidth according to an embodiment of the present invention.

Referring to FIG. 3, in order to update a transmission token value, it is checked whether a predetermined interval is reached or not in a waiting state in operations S21 and S22. If the predetermined interval is reached, the next entry, the transmission token value of the next LLID, is read in operation S23, and a predetermined increment is added to the transmission token value within the maximum value in operation S24. That is, the transmission token value increases by a predetermined increment at regular interval. If the transmission token value reaches the maximum value, the transmission token value does not increase. The updated transmission token value is recorded in a corresponding table in operation S25. The operations 23 to 26 are performed repeatedly until transmission token values for all LLIDs are processed in operation S26.

As described above, the transmission token value increases according to each of the LLIDs at a regular interval. If a gate for a predetermined LLID is generated, the transmission token value decreases as much as the length of the generated gate.

That is, a transmission token value of a LLID increases at regular rate regardless of whether gate is generated or not. When a next time of generating a gate is reached, it is allowed to generate gates as much as the increased transmission token value. A transmission toke value of a LLID decreases if a gate is generated for the LLID. Therefore, the gate generation rates can be about uniformly controlled according to the LLIDs In the present embodiment.

Furthermore, each LLID is classified into one of a plurality of classes and the gate generation can be processed class by class in the present embodiment. Processing in each class is as explained above.

Figure 4:
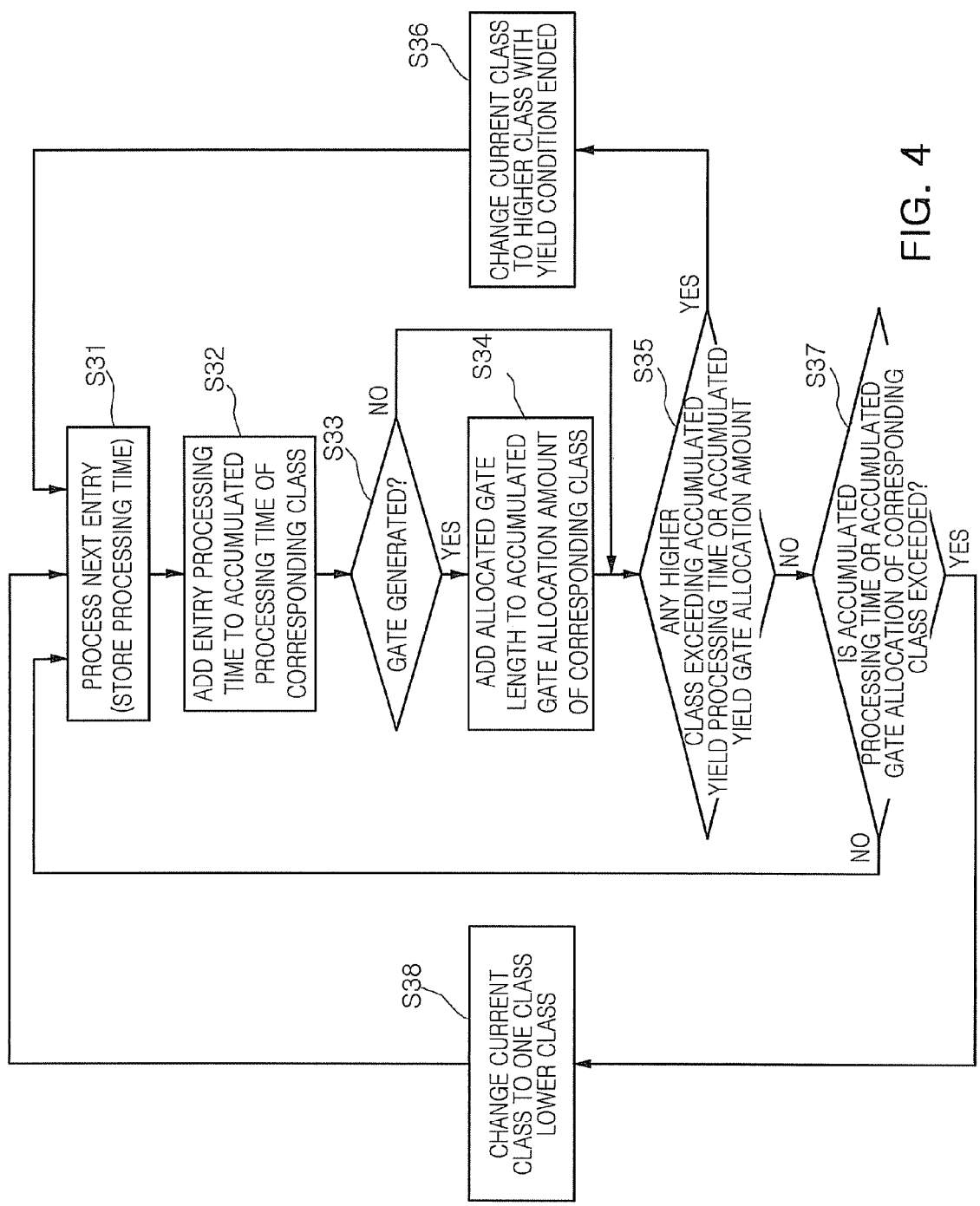
FIG. 4 is a flowchart illustrating a procedure of changing a processing class in a method for dynamically allocating a bandwidth according to an embodiment of the present invention.

FIG. 4 is a flowchart illustrating an operation of changing a processing class in a method for dynamically allocating a bandwidth according to an embodiment of the present invention. FIG. 4 shows an operation of deciding a LLID to be processed by the method shown in FIG. 2 and the class thereof.

In the present embodiment, LLIDs are classified each into one of a plurality of classes, and the classified LLIDs are grouped by the classes. In the processing of the grouped LLIDs, one of groups is selected to process sequentially from a high class to a low class, and the gate generation operation is processed for LLIDs in the selected class.

Information for dynamic bandwidth allocation can be managed according to each of the LLIDs through additional table. The table includes entries for corresponding LLID information, a token value that denotes the maximum gate length that can be allocated at one time, and the transmission token value for rate limiting in time average. Such entries are grouped by LLIDs and connected in a form of a linked list. The table will be described in detail later.

In order to select a class and a LLID to process, a maximum processing time $MAX\_Ti$, a maximum allocation amount $MAX\_Ai$, a maximum yield processing time $MAX\_YTi$, and a maximum yield allocation amount $MAX\_YAi$ are set for each class in advance. The maximum processing time $MAX\_Ti$ is the maximum time of a continuous processing in class i. The maximum allocation amount $MAX\_Ai$ is the sum of gates that can be allocated in a single processing duration of class i. The maximum yield processing time ($MAX\_YTi$) is the maximum time to yield processing to a class lower than the current class i. The maximum yield allocation amount ($MAX\_YAi$) is the maximum allocation amount that can be yield during the processing time for classes lower than class i.

In operation S31, the process for an LLID's entry is performed. In operation S32, the processing time of a LLID performing the process is accumulated to the processing time of the class including the LLID. In order to accumulate, a time of processing the gate generation of each LLID may be stored, and the stored time may be accumulated with a processing time of a corresponding class. However, it is preferable to use a free running counter and using the start-end difference to know the processing time.

In operation S33, it is determined whether a gate is generated or not while the entry is processed. In operation S34, the allocated gate length is added to an accumulated gate allocation amount of the corresponding class if the gate is generated. Accordingly, a processing time and a total allocation amount, which are the processing time and the total accumulated allocation amount continuously generated in a corresponding class, can be counted. Although it is not shown in FIG. 4, the yield processing time and the yield allocation amount, which are yield to a lower class, are counted in a class higher than the processed class.

Therefore, it is determined whether an accumulated yield processing time or an accumulated yield allocation amount at classes higher than a current class exceed the maximum yield processing time or the maximum yield allocation amount of that higher class or not in operation S35. If any class exceeds the maximum yield processing time or the maximum yield allocation amount, the processing class shifts to a corresponding higher class in operation S36.

In operation S37, if no class exceeds the maximum yield processing time or the maximum yield allocation amount, the processing time and the allocation amount of a corresponding class which are accumulated through the operations S32 and S34 are compared with the maximum processing time or the maximum allocation amount.

If the accumulated processing time or the accumulated allocation amount is smaller than the maximum processing time or the maximum allocation amount, the next entry of the same class, the next LLID, is processed in operation S31. On the contrary, if the accumulated processing time or the accumulated allocation amount is larger than the maximum processing time or the maximum allocation amount, a process class shifts to a lower class than the process class in operation S38. Then, an entry of the shifted class is processed in operation S31.

An entry location, a LLID, is memorized at a time of changing the current class to the next class. If the processing is returned back to the class, the next LLID from the memorized entry location is processed.

Also, if more than two classes exceed the maximum yield processing time or the maximum yield allocation amount in operation S35, it is preferred to select the higher class.

Figure 5:
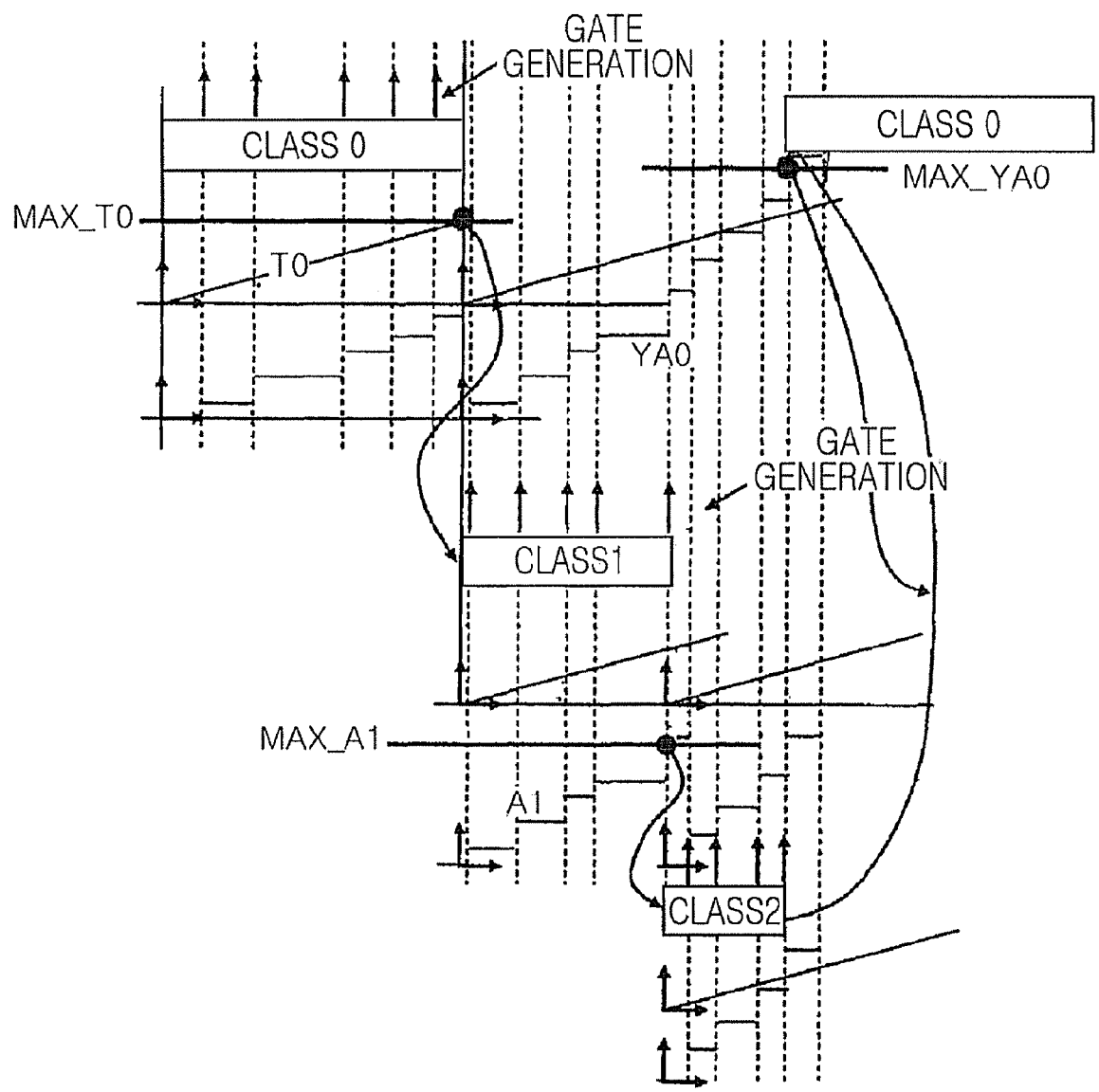
FIG. 5 is a diagram for describing a procedure of changing a processing class shown in FIG. 4.

FIG. 5 is a diagram for describing an operation of changing the processing class shown in FIG. 4.

That is, when the process for a class i starts, a processing time $Ti$ and the allocation amount $Ai$ of the corresponding class i is initialized to 0. While the corresponding class i is processing, the processing time $Ti$ continuously increases and the allocation amount $Ai$ also increases as much as the length of a generated gate whenever a gate is allocated. If the processing time $Ti$ reaches the maximum processing time $MAX\_Ti$ or if the allocation amount $Ai$ reaches the maximum allocation amount $MAX\_Ai$, the current class changes to the lower class. Before changing, the processing location of the current class i is stored. When the current class i is processed later, the process may start from the stored processing location of the class i.

At a moment of changing a process of a class i to a process of a lower class j by the above conditions, the yield processing time $YTi$ and the yield allocation amount $YAi$ of the class i are initialized to 0. Then, the yield processing time $YTi$ increases and the yield allocation amount $YAi$ increases as much as the length of a generated gate whenever a gate is allocated at any lower class. While processing the lower class j, if the yield processing time $YTi$ of the higher class i exceeds the maximum yield time $MAX\_YTi$, or if the yield allocation amount $YAi$ exceeds the maximum yield allocation amount $MAX\_YAi$, the processing class shifts to the higher class i again. As described above, an entry that is processed in a current class is stored when the current class shifts to other class. If it returns to the current class later, the next entry of the current class is processed based on the stored entry.

The yield and return processes can be applied identically to process more than two classes. While a class is processing, if the maximum yield processing time and the maximum yield allocation amount exceed in more than two classes at the same time, it returns to the higher class. When a class yields to a lower class due to predetermined yield conditions, the class yields to the nearest lower class, basically. However, if a higher class has a return request, it returns to the class having the return request.

Referring to FIG. 5 again, while class 0 is processing, if the processing time T0 reaches the maximum processing time $MAX\_T0$, the class 0 shifts to a class 1. While class 1 is in process, if the allocation amount A1 of the class 1 exceeds the maximum allocation amount $MAX\_A1$, the class 1 shifts to class 2. While a bandwidth allocation for the LLID of the class 2 is processing, if a yield allocation amount $YA0$ exceeds the maximum yield allocation amount $MAX\_YA0$ in the class 0, the processing is forcedly switched from class 2 to class 0.

Figure 6:
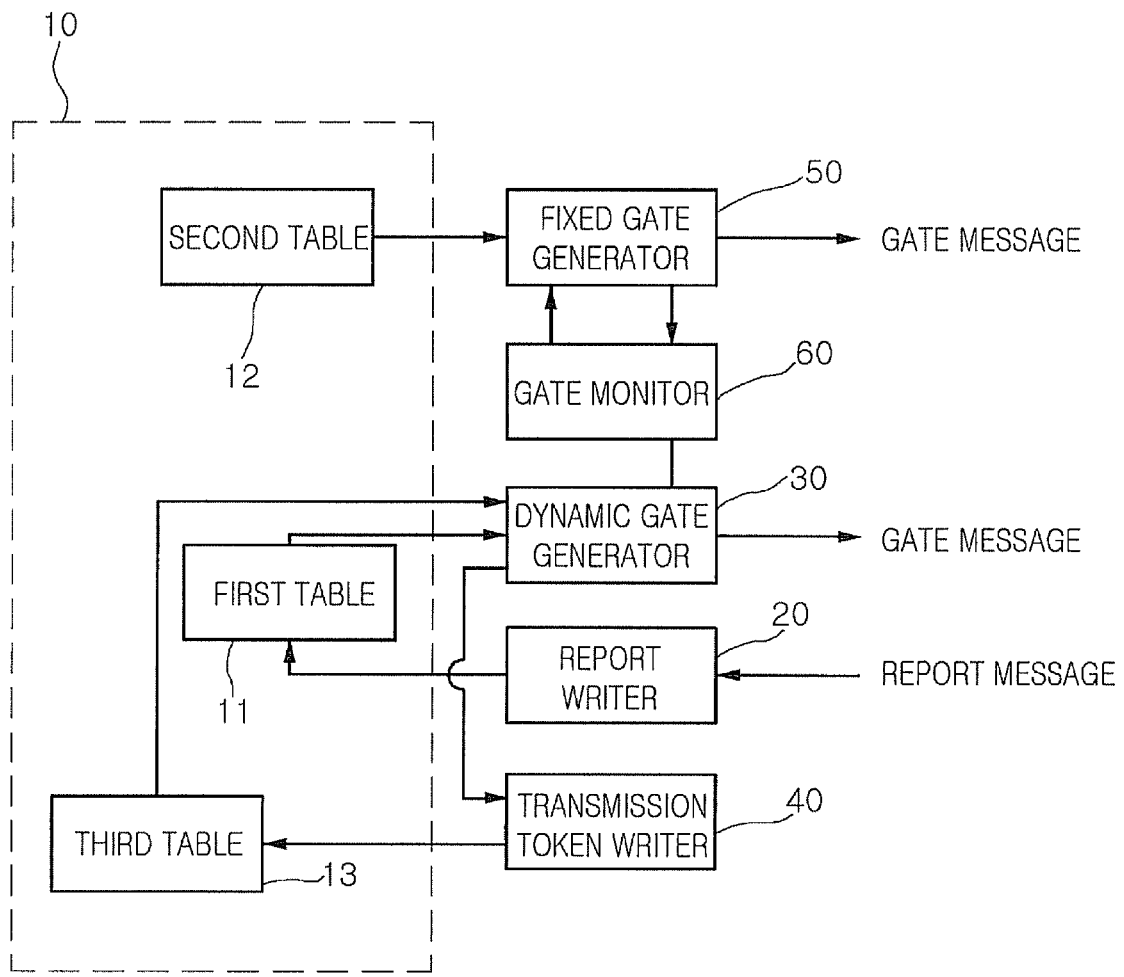
FIG. 6 is a block diagram illustrating an apparatus for dynamically allocating a bandwidth according to an embodiment of the present invention.

FIG. 6 is a block diagram illustrating an apparatus for dynamically allocating a bandwidth according to an embodiment of the present invention. Constituent elements of the apparatus for dynamically allocating a bandwidth according to the present embodiment can be embodied in software or in hardware.

Referring to FIG. 6, the dynamic bandwidth allocating apparatus according to the present embodiment includes a first table 11 for storing information for dynamic bandwidth allocation including report values of each LLID, a report writer 20 for recording the report value of a report message at the first table 11 when the report message is received from an ONU, and a dynamic gate generator 30 for repeatedly performing operations of reading report values of each LLID from the first table 11, generating a gate having a length corresponding to the report value, and deleting the report value related to the generated gate from the table 11, sequentially, without a predetermined interval.

The table 11 stores information required for dynamic bandwidth allocation. The table 11 may further store the maximum gate length that can be allocated at one time, which is set according to each LLID with a report value. In this case, the dynamic gate generator 30 restricts the read report value to control the length of a gate to generate within the maximum gate length stored in the first table 11. Accordingly, it is prevented from allocating excessive bandwidth to a predetermined LLID by restricting the maximum gate length allocated to each LLID at one time.

The report writer 20 receives a report message that is transmitted through the last part of a burst transmitted by a gate. In the present embodiment, it is unnecessary to allocate additional bandwidth using gate message only for the report message because the last part of the burst is used to transmit the report message. Therefore, the overall throughput increases.

Furthermore, the dynamic gate generator 30 does not generate a gate if the read report value is 0. Therefore, unnecessary bandwidth allocation is prevented.

Referring to FIG. 6 again, the dynamic bandwidth allocation apparatus may further include a second table 12 for storing fixed gate lengths set according to each LLID, a fixed gate generator 50 for reading the fixed gate length for a LLID that did not generate gate for a predetermined time, and generating a fixed gate, and a gate monitor 60 for monitoring gates of each LLID, that are generated from the dynamic gate generator 30 and the fixed gate generator 50.

The dynamic bandwidth allocating apparatus according to the present invention further includes a third table 13 for storing transmission token values of each LLID for restricting a gate generation rate in time average meaning. In this case, the dynamic gate generator 30 checks the transmission token value for a corresponding LLID from the third table 13 before generating a gate, and generates a gate only if the third table 13 includes sufficient transmission token value for the gate length to be generated. Accordingly, the bandwidth allocating rate can be controlled for each of LLIDS.

Furthermore, the dynamic bandwidth allocation apparatus further includes a transmission token writer 40 for increasing the transmission token values of all LLIDs in the third table 13 by a unit value periodically with a predetermined interval.

The transmission token writer 40 controls the maximum value of the transmission token value according to each LLID so as to control the transmission token value not to increase higher than a predetermined maximum value. Also, the dynamic gate generator 30 decreases the transmission token value of a corresponding LLID as much as a gate length when the dynamic gate generator 30 generates a gate.

The first table 11 includes entries for storing LLID values, a token value which is a maximum gate length that can be generated at one time, and a report value received from a corresponding LLID. The LLIDs are each classified into one of a plurality of classes, and entries for LLIDs belonging to the same class are connected in a form of linked list.

Figure 7:
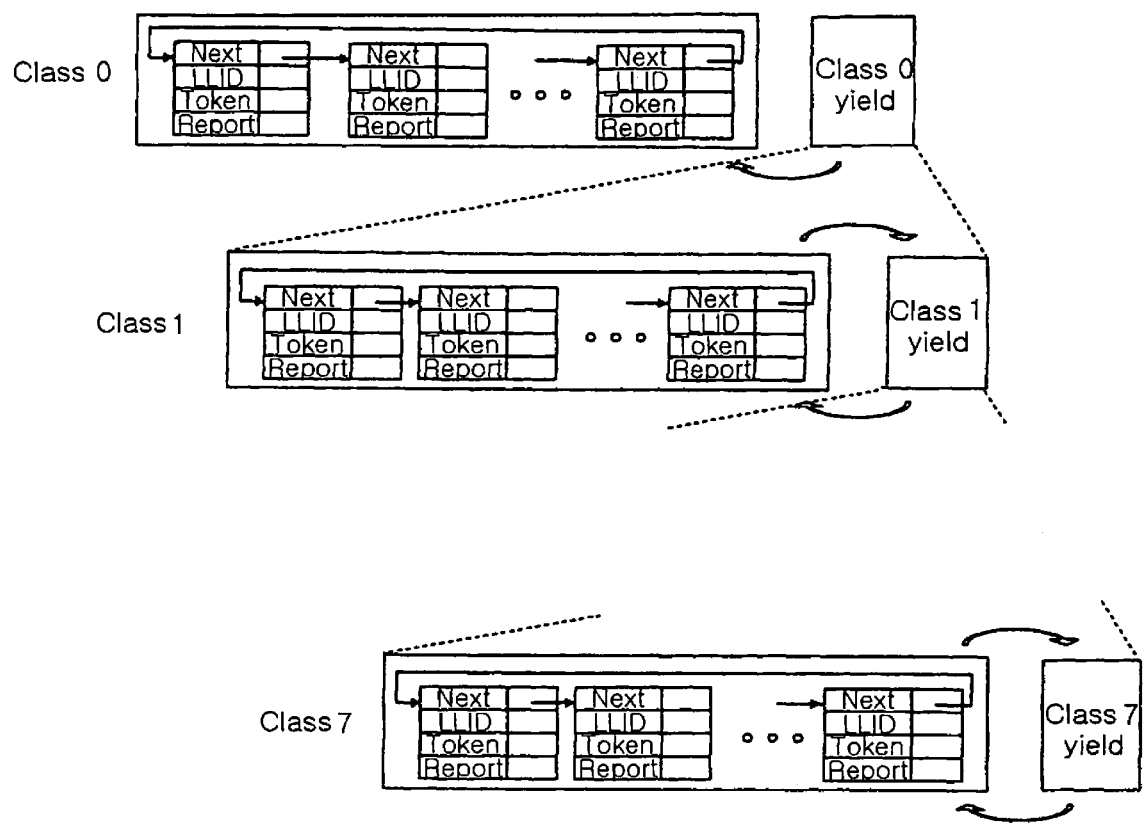
FIG. 7 is a diagram illustrating a first table in an apparatus for dynamically allocating a bandwidth according to an embodiment of the present invention.

FIG. 7 is a diagram illustrating a first table in an apparatus for dynamically allocating a bandwidth according to an embodiment of the present invention. Each entry includes the corresponding LLID value, a token value that is the maximum gate length that can be generated at one time, and a received report value. All LLIDs are classified into classes, and entries of the LLID in the same class are connected in a linked list form.

Although it is described that classes are located at different locations in FIG. 7, they are embodied in the same memory. Also, the first table 11, the second table 12, and the third table 13 can be embodied in the same storing unit 10.

The dynamic gate generator 30 sequentially checks each of the linked entries from the higher class and finds a gate related to a corresponding LLID.

The dynamic gate generator 30 processes LLIDs by classes. That is, the dynamic gate generator 30 sets a maximum processing time and a maximum allocation amount for each LLID class, counts a continuous processing time and allocated gate amount for each LLID class, and switches to a LLID in the next lower class if the maximum processing time or the maximum allocation amount is reached. Also, the dynamic gate generator 30 sets the maximum yield processing time and the maximum yield allocation amount according to each LLID class, counts a gate processing time and a gate allocation amount in a lower class by each LLID class, and switches to a LLID in the higher class that exceeds the maximum yield processing time or the maximum yield allocation amount if the maximum yield processing time or the maximum yield allocation amount is reached.

Accordingly, the gate allocation is performed within a restricted range according to each LLID class. Therefore, it is prevented from allocating excessive bandwidth to a predetermined class, and different maximum processing time or maximum allocation amount can be assigned to each class.

Furthermore, the dynamic gate generator 30 memorizes a LLID that was processed when one class shifts to the other. When the class shifts back to the previous class, the dynamic gate generator 30 continuously process the next LLID from the memorized LLID. If more than two classes exceed the maximum yield processing time and the maximum allocation amount, the dynamic gate generator 30 selects the higher class.

The dynamic bandwidth allocating apparatus according to the present invention is embodied by performing the dynamic bandwidth allocating method according to the present invention. It will be clearly understood with reference to the description of the dynamic bandwidth allocating method.

As described above, in an EPON system using this invention, an OLT transmits a gate to a corresponding LLID right after receiving a report. Therefore, the operating ONUs has short waiting delay. Also, additional reports are not required for generating a gate. Therefore, the overall throughput increases. Furthermore, uplink and downlink overhead can be reduced and the overall uplink and downlink throughput can increase by transmitting gates necessary for minimum polling.

In the present invention, different minimum polling cycles can be provided to each of ONUs. Therefore, the worst delay problem can be controlled, and the maximum delay time can be controlled in an active state through controlling a priority according to each class.

In the present invention, the maximum uplink bandwidth can be provided while a minimum bandwidth is guaranteed to each of LLIDs.

In the present invention, it is possible to allocate a remaining bandwidth to LLIDs requesting a bandwidth exceeding the minimum guaranteed bandwidth in proportion to the minimum guaranteed bandwidth.

While the present invention has been shown and described in connection with the exemplary embodiments, it will be apparent to those skilled in the art that modifications and variations can be made without departing from the spirit and scope of the invention as defined by the appended claims.

What is claimed is:

1. A method for dynamically allocating a bandwidth based on a hierarchical weight round robin scheme, comprising:

reading reports received for logical link identifications (LLID) that are allocated to optical network unit (ONUs), wherein the LLIDs are each classified into one of a plurality of classes, in the reading of reports, a class to process is selected recursively from a high class to a low class, and
report values are sequentially read and gates generated for LLIDs in the selected class;
restricting the read report value to be less than a maximum gate value set for a corresponding LLID;
generating a gate having a length corresponding to the restricted report value; and
deleting a report after generating a gate using it,
wherein the reading of the reports received and generating the gate for each LLID comprises:
  setting a maximum processing time and a maximum amount of total allocated gate for single continuous processing for each LLID class;
  counting the processing time for the report reading and a total allocated gate amount during a single class processing; and
  changing the processing class to the next lower class if the counted processing time exceeds the maximum processing time or if the allocation amount exceeds the maximum allocation amount, and
wherein the reading of reports, the restricting of the read report value, the generating of the gate, and the deleting of the report are repeatedly performed in sequence for LLIDs.

2. The method of claim 1, further comprising not generating a gate if the read report value is 0.

3. The method of claim 2, further comprising monitoring gates generated for each LLID, and transmitting a gate with a predetermined fixed length for an LLID if gate has not been generated for a predetermined time for the LLID.

4. The method of claim 1, further comprising, before the generating of the gate having a length corresponding to the restricted report value;
  confirming whether a rate restricting function for a corresponding LLID is activated or not;
  determining whether a transmission token value that is set to restrict bandwidth for a corresponding LLID is 0 or not if the rate restricting function is activated;
  confirming whether a transmission token value is sufficient or not by comparing a transmission token value of the LLID and the gate length to generate if the transmission toke value is not 0;
  not generating a gate having a length corresponding to the read report and reading a report for a next LLID if the transmission token value is 0 or if the transmission token value is insufficient; and
  generating the gate if the rate restricting function is inactivated or if the transmission token value is sufficient.

5. The method of claim 4, further comprising increasing transmission token values of all LLIDs by a unit length set for each LLID at a regular interval.

6. The method of claim 5, wherein in the increasing of the transmission token values, a maximum value of the transmission token value is controlled for each LLID so as not to increase the transmission token values greater than the predetermined maximum value.

7. The method of claim 5, further comprising reducing the transmission token value for a corresponding LLID as much as the generated gate length when a gate is generated.

8. The method of claim 1, wherein the reading the reports received and generating the gate for the LLIDs comprising:
  setting a maximum yield processing time and a maximum yield allocation amount for LLID classes;
  counting the yield time and the yield allocation amount, which are the processing time and a gate allocation amount of lower classes for each LLID class; and
  changing a processing class to a higher class that exceeds the maximum yield processing time or the maximum yield allocation amount if the counted yield time exceeds the maximum yield processing time or the counted yield allocation amount exceeds the maximum yield allocation amount for the higher class.

9. The method of claim 8, wherein in the changing of the processing class to a class exceeding a maximum yield processing time or a maximum yield allocation amount, a higher class is selected if more than two classes exceed the maximum yield processing time or the maximum yield allocation amount.

10. An apparatus for dynamically allocating a bandwidth comprising:
  a first table, contained in a memory device, for storing information for dynamically allocating a bandwidth, which includes report values according to logical link identifications (LLIDs),
    wherein the first table further stores a maximum gate length set for LLID,
    the first table includes entries for a LLID value of each LLID, a token value that is a maximum gate length, and a report value received from a corresponding LLID, and
    the LLIDs are each classified into one of a plurality of classes, and corresponding entries of LLIDs of the same class are connected in a linked list;
  a report writer for recording a report value of a received report message at the first table if the report message is received from an optical network unit (ONU); and
  a dynamic gate generator for repeatedly performing operations of sequentially reading report value of each logical link identification (LLID) without a predetermined cycle, generating a gate having a length corresponding to the report value, and deleting the report value after use when a gate is generated from the first table,
    wherein the dynamic gate generator restricts the read report value to make the generated gate length to be within a maximum gate length stored in the first table,
    the dynamic gate generator selects a class to process sequentially from a high class to a low class, and reads report values and generates gates for LLIDs in the first table in the selected class, and
    the dynamic gate generator sets a maximum processing time and a maximum total allocation amount, counts the processing time and total gate allocation amount in a corresponding class during the class's processing, and process an LLID of a next lower class if the count values exceed the maximum processing time or the maximum allocating time of that class.

11. The apparatus of claim 10, wherein the dynamic gate generator does not generate a gate if the read report value is 0.

12. The apparatus of claim 10, further comprising:
  a second table for storing fixed gate lengths set for each LLID;
  a fixed gate generator for reading a fixed gate length from the second table and generating a fixed gate for LLIDs that did not generate any gate for a predetermined time; and
  a gate monitor for monitoring the dynamic gate generator and the fixed gate generator and providing the monitoring result to the fixed gate generator.

13. The apparatus of claim 10, further comprising a third table for storing transmission token values for controlling a gate generating rate according to each of LLIDs,
wherein the dynamic gate generator checks a transmission token value for each LLID before a gate is generated, and generates a gate only if the third table includes a transmission token value sufficient for the generated gate length.

14. The apparatus of claim 13, further comprising a transmission token writer for increasing transmission token values of all LLIDs in the third table by a predetermined unit set for each LLID regularly with a predetermined interval.

15. The apparatus of claim 14, wherein the transmission token writer does not increase the transmission token value to be greater than a predetermined maximum value by controlling a maximum value of a transmission token value for each of LLID.

16. The apparatus of claim 15, wherein the dynamic gate generator reduces a transmission token value of a corresponding LLID as much as a generated gate length after it generates a gate.

17. The apparatus of claim 10, wherein the dynamic gate generator sets a maximum yield processing time and a maximum yield allocation amount for each LLID class, counts a yield gate processing time and a yield gate allocation amount for each class, and processing switches back to a higher class that exceeds the maximum yield processing time or the maximum yield allocation amount.

18. The apparatus of claim 17, wherein the dynamic gate generator selects a higher class if more than two classes exceed the maximum yield processing time or the maximum yield allocation amount.

* * * * *

UNITED STATES PATENT AND TRADEMARK OFFICE
CERTIFICATE OF CORRECTION

PATENT NO.        : 7,936,765 B2                                    Page 1 of 1
APPLICATION NO.   : 11/948950
DATED             : May 3, 2011
INVENTOR(S)       : Chan Kim et al.

It is certified that error appears in the above-identified patent and that said Letters Patent is hereby corrected as shown below:

On the title page, item (73), please correct the Assignee's name to read "Electronics and Telecommunications Research Institute"

Signed and Sealed this
Twenty-third Day of August, 2011

David J. Kappos
*Director of the United States Patent and Trademark Office*